US011763025B2

United States Patent
Suzuki et al.

(10) Patent No.: US 11,763,025 B2
(45) Date of Patent: Sep. 19, 2023

(54) PERSONAL INFORMATION ANALYSIS SYSTEM AND PERSONAL INFORMATION ANALYSIS METHOD

(71) Applicant: HITACHI, LTD., Tokyo (JP)

(72) Inventors: Takayuki Suzuki, Tokyo (JP); Masayuki Yoshino, Tokyo (JP); Tetsuhiro Hatogai, Tokyo (JP); Masaaki Tanizaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 386 days.

(21) Appl. No.: 17/255,634

(22) PCT Filed: Jun. 18, 2019

(86) PCT No.: PCT/JP2019/024066
§ 371 (c)(1),
(2) Date: Dec. 23, 2020

(87) PCT Pub. No.: WO2020/004139
PCT Pub. Date: Jan. 2, 2020

(65) Prior Publication Data
US 2021/0279368 A1    Sep. 9, 2021

(30) Foreign Application Priority Data
Jun. 27, 2018  (JP) ............... 2018-121643

(51) Int. Cl.
*G06F 21/62*   (2013.01)
*G06F 21/60*   (2013.01)
*G06F 18/21*   (2023.01)

(52) U.S. Cl.
CPC ........ *G06F 21/6245* (2013.01); *G06F 18/217* (2023.01); *G06F 21/602* (2013.01); *G06F 21/6254* (2013.01)

(58) Field of Classification Search
CPC .. G06F 21/6245; G06F 18/217; G06F 21/602; G06F 21/6254
See application file for complete search history.

(56) References Cited

U.S. PATENT DOCUMENTS

2017/0061156 A1*  3/2017  Hamamoto ......... G06F 21/6254
2017/0177683 A1*  6/2017  Koike ................. G06F 21/6254
(Continued)

FOREIGN PATENT DOCUMENTS

JP       6192064 B2      9/2017

OTHER PUBLICATIONS

Australian Examination Report dated Oct. 15, 2021, issued in corresponding Australian Application No. 2019293106.
(Continued)

*Primary Examiner* — Stephen T Gundry
(74) *Attorney, Agent, or Firm* — MATTINGLY & MALUR, PC

(57) ABSTRACT

An analysis execution part 11 that, in response to a request for an analysis on a predetermined subject utilizing pieces of personal information 35, generates a first analysis result based on a plurality of pieces of personal information 35 associated with an item necessary for performing the analysis, and anonymizes the plurality of pieces of personal information 35 and generates a second analysis result for the request for the analysis based on the anonymized pieces of information, and an analysis result evaluation part 12 that generates information on a difference between the generated first analysis result and the generated second analysis result are provided.

11 Claims, 17 Drawing Sheets

(56) References Cited

U.S. PATENT DOCUMENTS

| | | | |
|---|---|---|---|
| 2018/0082108 A1* | 3/2018 | Phamduy | G06V 40/172 |
| 2019/0087386 A1* | 3/2019 | Ono | G06Q 10/06 |
| 2019/0102738 A1* | 4/2019 | Takamiya | G06F 16/355 |
| 2019/0114722 A1* | 4/2019 | Shimada | G16H 10/60 |
| 2019/0213002 A1* | 7/2019 | Yamamoto | G06Q 10/067 |
| 2019/0220902 A1* | 7/2019 | Sakata | G06Q 30/0277 |
| 2019/0273733 A1* | 9/2019 | Kawabata | H04L 63/0876 |
| 2019/0286849 A1* | 9/2019 | Oberhofer | G06F 16/21 |
| 2019/0287686 A1* | 9/2019 | Takeda | G06F 21/6254 |
| 2019/0295164 A1* | 9/2019 | Hoshino | G06Q 40/03 |
| 2019/0361844 A1* | 11/2019 | Mizuno | G06F 9/3005 |
| 2019/0392169 A1* | 12/2019 | Mori | G06F 21/6245 |
| 2020/0019963 A1* | 1/2020 | Nakamura | G06Q 20/401 |
| 2021/0049274 A1* | 2/2021 | Ikeda | G06F 18/217 |
| 2021/0049303 A1* | 2/2021 | Morita | G06F 16/345 |
| 2021/0142340 A1* | 5/2021 | Oda | H04Q 9/00 |
| 2021/0182792 A1* | 6/2021 | Aryeetey | H04L 9/14 |
| 2021/0192025 A1* | 6/2021 | Suzuki | G06F 21/602 |
| 2021/0219159 A1* | 7/2021 | Sato | H04W 24/10 |
| 2021/0293837 A1* | 9/2021 | Sugiyama | G01N 35/00871 |

OTHER PUBLICATIONS

Reiter, J.P. et al., 'Verification servers: Enabling analysts to assess the quality of inferences from public use data', Computational Statistics & Data Analysis, vol. 53, No. 4, 2009.

Extended European Search Report received in corresponding European Application No. 19827354.2 dated Feb. 14, 2022.

Australian Office Action received in corresponding Australian Application No. 2019293106 dated May 17, 2022.

International Search Report of PCT/JP2019/024066 dated Sep. 24, 2019.

* cited by examiner

POLICY MANAGEMENT TABLE

| INDIVIDUAL ID | PRICE | NON-PROVIDABLE | ... |
|---|---|---|---|
| A | a YEN | MEDICAL-RELATED INFORMATION | ... |
| B | b YEN | NONE | ... |
| C | c YEN | ASSET-RELATED INFORMATION | ... |
| : | | | |

ANALYSIS REQUEST INFORMATION — 200

| | |
|---|---|
| ANALYSIS TARGET | ASSETS HELD |
| ANONYMIZATION METHOD | k-ANONYMIZATION |
| EVALUATION METHOD | EVALUATION METHOD A |
| PROPOSED PRICE | P0,000 YENS |
| DESIGNATED DATA ITEM | REAL ESTATE |
| : | : |

201 — ANALYSIS TARGET
202 — ANONYMIZATION METHOD
203 — EVALUATION METHOD
204 — PROPOSED PRICE
205 — DESIGNATED DATA ITEM

FIG. 8

DATA ITEM MANAGEMENT TABLE 401                          402                         ← 400

| ANALYSIS SUBJECT NAME | DATA ITEM NAME |
|---|---|
| ASSET ANALYSIS | NAME, SEX, AGE, ADDRESS, REAL ESTATE |
| ASSET ANALYSIS | NAME, SEX, AGE, ADDRESS, SAVINGS, STOCKS |
| DISEASE ANALYSIS | NAME, SEX, AGE, ADDRESS, CLINICAL HISTORY |
| DISEASE ANALYSIS | NAME, SEX, AGE, ADDRESS, MEDICATION HISTORY |
| : | : |

FIG. 11

RECORD CONFIGURATION SIMILAR ITEM MANAGEMENT TABLE

# PERSONAL INFORMATION ANALYSIS SYSTEM AND PERSONAL INFORMATION ANALYSIS METHOD

TECHNICAL FIELD

The present invention relates to a personal information analysis system and a personal information analysis method.

BACKGROUND ART

Incorporation by Reference

This application is based upon and claims the benefit of priority to Japanese Patent Application No. 2018-121643 filed on Jun. 27, 2018, the entire contents of which are incorporated herein by reference.

The progress in application of IT (Information Technology), the evolution of artificial intelligence, and so on in recent years have made it increasingly possible to collect a large amount of data and analyze and utilize them. In view of such circumstances, commercialization of a so-called information bank has been considered in which a business owner receives personal information from a large number of individuals and utilizes it to provide useful information to a third party.

Many techniques have heretofore been proposed as methods of managing personal information. For example, Patent Literature 1 discloses an information anonymization processing apparatus including an information reading part that reads out pieces of information to be externally provided, an information anonymization processing part that anonymizes at least some of the pieces of information read out, and an information transmission part that transmits the anonymized pieces of information as pieces of information to be externally provided, and further having an information evaluation part that evaluates the pieces of information to be externally provided read out by the information reading unit, the information evaluation part having an information checking function of checking each piece of information to be externally provided read out by the information reading part against information accumulated in a public database or a database permitted to be browsed.

CITATION LIST

Patent Literature

[PTL 1] Japanese Patent No. 6192064

SUMMARY OF INVENTION

Technical Problem

Here, when an information bank receives a large amount of personal information and utilizes them, providing useful information to a third party who utilizes the personal information is important but more important is a measure to protect the individuals' privacy.

The present invention has been made in view of such circumstances, and an object thereof is to provide a personal information analysis system and a personal information analysis method capable of providing a third party with useful information utilizing personal information while protecting this personal information.

Solution to Problem

In order to solve the above problem, one aspect of the present invention is a personal information analysis system comprising an analysis execution part that, in response to a request for an analysis on a predetermined subject utilizing pieces of personal information, generates a first analysis result based on a plurality of pieces of personal information associated with an item necessary for performing the analysis, and anonymizes the plurality of pieces of personal information and generates a second analysis result for the request for the analysis based on the anonymized pieces of information, and an analysis result evaluation part that generates information on a difference between the generated first analysis result and the generated second analysis result.

Advantageous Effects of Invention

According to the present invention, it is possible to provide a third party with useful information utilizing personal information while protecting this personal information.

BRIEF DESCRIPTION OF DRAWINGS

FIG. 8 is a diagram illustrating an example of analysis request information.

FIG. 11 is a diagram illustrating an example of the record configuration of a data item management table.

DESCRIPTION OF EMBODIMENTS

Embodiments of the present invention will be described with reference to the drawings.

First Embodiment

Firstly, a personal information analysis system in a first embodiment will be described.

<System Configuration>

Figure 1:
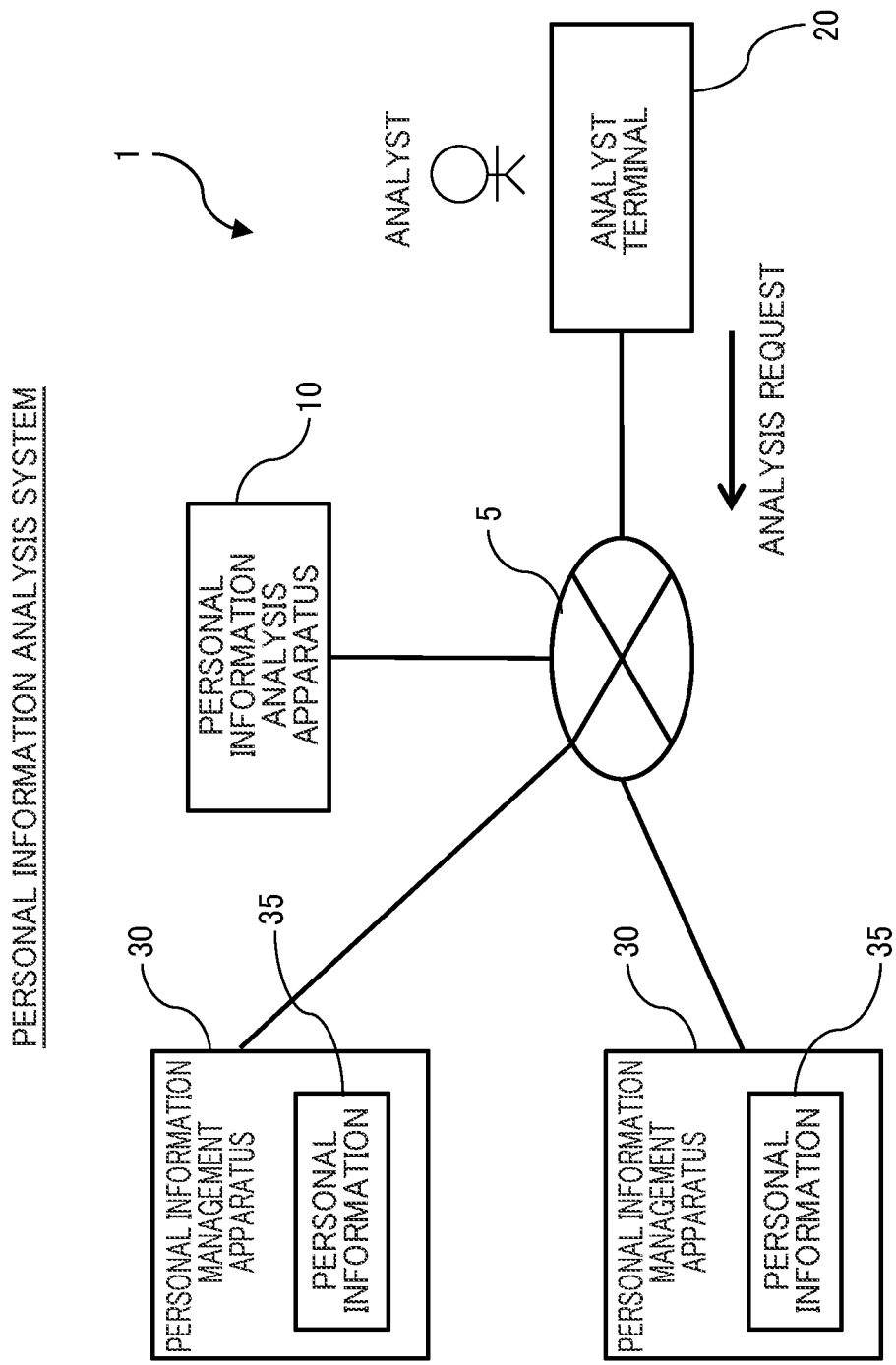
FIG. 1 is a diagram illustrating an example of the configuration of a personal information analysis system in a first embodiment.

FIG. 1 is a diagram illustrating an example of the configuration of a personal information analysis system 1 in the first embodiment. The personal information analysis system 1 includes one or more personal information management apparatuses 30 storing one or more pieces of personal information 35 possessed by a plurality of individuals or corporations (clients), a personal information analysis apparatus 10 capable of performing predetermined analyses based on the pieces of personal information 35, and one or more analyst terminals 20 that request the personal information analysis apparatus 10 to perform an analysis. Note that the personal information analysis apparatus 10 and each analyst terminal 20 and the personal information analysis apparatus 10 and each personal information management apparatus 30 are coupled by a wired or wireless communication network 5, such as a LAN (Local Area Network), a WAN (Wide Area Network), the Internet, or a dedicated line, for example.

The personal information management apparatus 30 is, for example, an information processing apparatus managed by an information bank, and receives and stores pieces of personal information 35 possessed by banks, various enterprises, predetermined information agencies, government offices, autonomous communities, credit information agencies, and the like.

The analyst terminal 20 is, for example, an information processing apparatus to be used by any one of various enterprises, an NPO (Nonprofit Organization), a government office, an autonomous community, a research agency, or the like.

Based on an analysis request from the analyst terminal 20, the personal information analysis apparatus 10 performs an analysis corresponding to the request by utilizing the pieces of personal information 35 managed by the personal information management apparatus 30. The personal information analysis apparatus 10 is, for example, an information processing apparatus managed by an information bank, a predetermined business owner, or the like.

Figure 2:
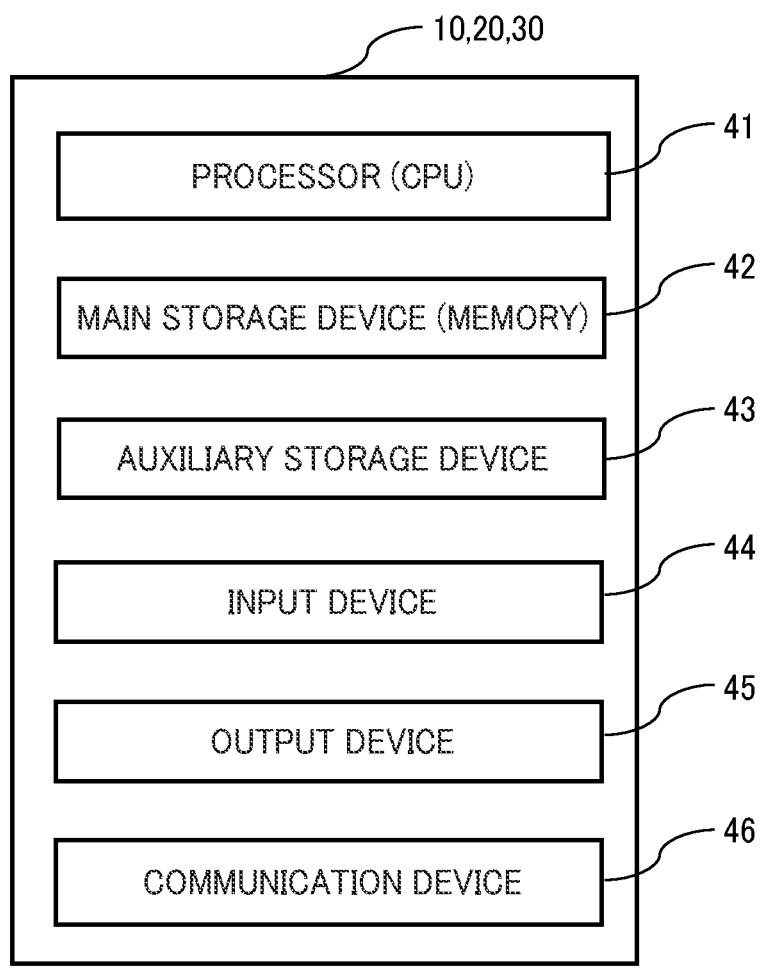
FIG. 2 is a diagram illustrating an example of hardware included in a personal information analysis apparatus, an analyst terminal, and a personal information management apparatus.

FIG. 2 is a diagram illustrating an example of hardware included in the personal information analysis apparatus 10, the analyst terminal 20, and the personal information management apparatus 30. These information processing apparatuses includes: a processor 41, such as a CPU (Central Processing Unit); a main storage device 42, such as a RAM (Random Access Memory) and a ROM (Read Only Memory); an auxiliary storage device 43, such as an HDD (Hard Disk Drive) or an SSD (Solid State Drive); an input device 44 including a keyboard, a mouse, a touchscreen, and/or the like; an output device 45 including a monitor (display) or the like; and a communication device 46 that communicates with the other information processing apparatuses.

Next, functions included in the information processing apparatuses will be described.

<Personal Information Analysis Apparatus 10>

Figure 3:
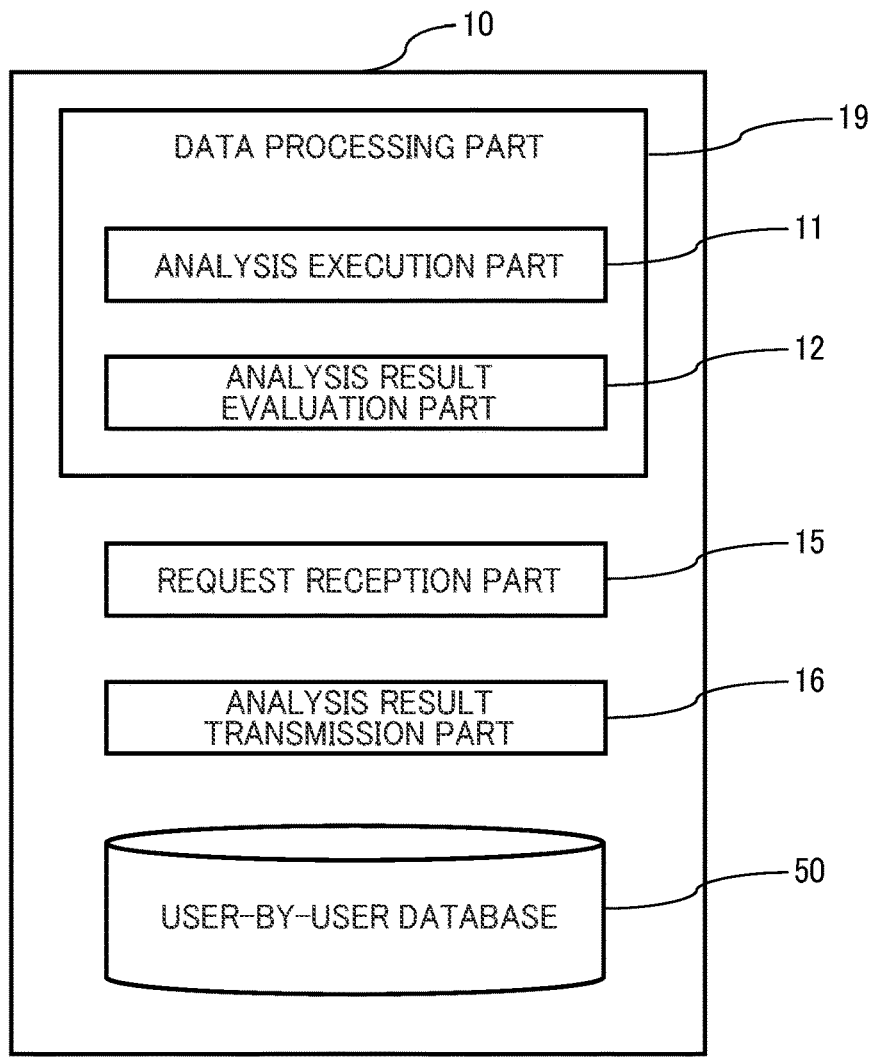
FIG. 3 is a diagram explaining an example of main functions included in the personal information analysis apparatus.

FIG. 3 is a diagram explaining an example of main functions included in the personal information analysis apparatus 10. The personal information analysis apparatus 10 includes an analysis execution part 11 and an analysis result evaluation part 12.

The analysis execution part 11, in response to a request for an analysis of a predetermined subject (hereinafter referred to as the analysis subject) utilizing pieces of personal information, generates a first analysis result based on a plurality of pieces of personal information associated with an item necessary for performing the analysis (hereinafter referred to as the necessary data item), and anonymizes the plurality of pieces of personal information and generates a second analysis result for the analysis request based on the pieces of information thus anonymized (hereinafter also referred to as the anonymized pieces of information).

Note that, based on policies being conditions for use of the pieces of personal information in the analysis, the analysis execution part 11 identifies the pieces of personal information 35 to be used in the analysis, and generates the first analysis result and the second analysis result based on the identified pieces of personal information 35.

The analysis result evaluation part 12 generates information on the difference between the first analysis result and the second analysis result generated by the analysis execution part 11 (indicated as the difference between evaluation values of the analysis results, for example).

Note that, each time a request is given from an analyst, the pieces of personal information 35 used by the personal information analysis apparatus 10, the first analysis result, the second analysis result, and the information on the difference (e.g., between the evaluation values) are stored in a user-by-user database 50. Note that the pieces of information to be stored in the user-by-user database 50 may be anonymized and/or encrypted depending on the policies.

Incidentally, the analysis execution part 11 and the analysis result evaluation part 12 are incorporated in a predetermined data processing part 19. External access to the data of the data processing part 19 is restricted, and external transmission of the data is restricted. In an example, the data processing part 19 is implemented as software or hardware. In the case of hardware, the data processing part 19 is implemented by, for example, providing an information processing apparatus other than the personal information analysis apparatus 10 or devices (e.g., a memory and an encryption processor). On the other hand, in the case of software, the data processing part 19 is implemented by providing an OS (Operating System) different from the OS running on the personal information analysis apparatus 10 or a virtual OS.

The personal information analysis apparatus 10 further includes a request reception part 15 that receives an analysis request from the analyst terminal 20, and an analysis result transmission part 16 that transmits the information on the difference between the first analysis result and the second analysis result generated based on this analysis request to the analyst terminal 20.

<Analyst Terminal 20>

Figure 4:
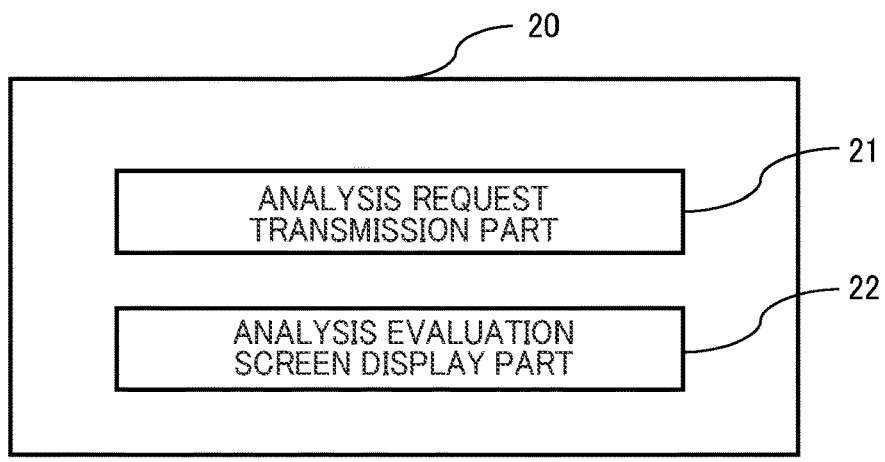
FIG. 4 is a diagram explaining an example of main functions included in the analyst terminal.

Next, FIG. 4 is a diagram explaining an example of main functions included in the analyst terminal 20. The analyst terminal 20 includes an analysis request transmission part 21 and an analysis evaluation screen display part 22.

The analysis request transmission part 21 transmits information of an analysis request to the personal information analysis apparatus 10. The analysis evaluation screen display part 22 displays the information on the difference between the first analysis result and the second analysis result generated by the personal information analysis apparatus 10.

<Personal Information Management Apparatus 30>

Figures 5, 6:
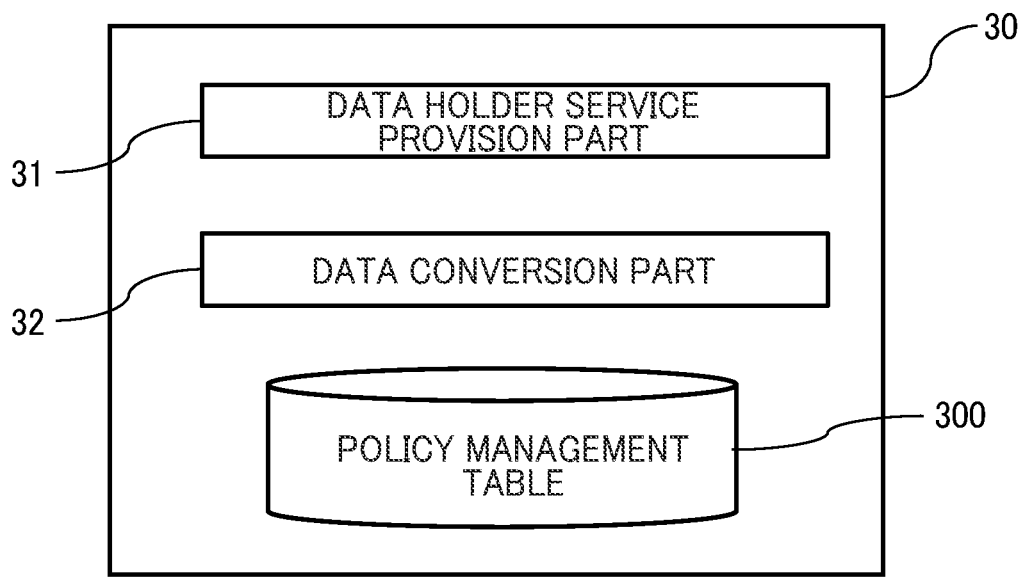
FIG. 5 is a diagram explaining an example of main functions included in the personal information management apparatus.
FIG. 6 is a diagram illustrating an example of a policy management table.

FIG. 5 is a diagram explaining an example of main functions included in the personal information management apparatus 30. The personal information management apparatus 30 includes a data holder service provision part 31 and a data conversion part 32.

The data holder service provision part 31 stores the pieces of personal information 35 possessed by a plurality of clients (data holders).

The data conversion part 32 converts the pieces of personal information 35 into a predetermined data format that is processable by the personal information analysis apparatus 10, and transmits the converted pieces of personal information 35 to the personal information analysis apparatus 10. For example, the data conversion part 32 encrypts the pieces of personal information 35 and transmits them to the personal information analysis apparatus 10. Specifically, for example, the personal information analysis apparatus 10 provides a predetermined encryption key to the personal information management apparatus 30 in advance, and the personal information management apparatus 30 performs encryption by using this key.

Here, the personal information management apparatus 30 stores the above-mentioned policies in a policy management table 300.

<Policy Management Table 300>

FIG. 6 is a diagram illustrating an example of the policy management table 300. The policy management table 300 includes one or more records each having items of: an individual ID 301 storing an identifier of the entity (client) possessing pieces of personal information 35; a price 302 storing the amount of money which the client with the individual ID 301, the entity managing the personal information management apparatus 30, or the like demands of the analyst using the pieces of personal information 35; and non-providable 303 storing an item in the pieces of personal information 35 which the client with the individual ID 301 cannot provide (hereinafter referred to as the non-providable item).

Note that besides the above, a degree of anonymization to be tolerated in analyses (e.g., k value in k-anonymization), the personal information management apparatus 30 storing the pieces of personal information 35 that can be used for analyses (the information bank or the like that gives a permission to provide the pieces of personal information), and so on may be used as items in the policy management table 300.

The above-described functions of each information processing apparatus are implemented by hardware of the information processing apparatus or by causing the processor 41 of the information processing apparatus to read out and execute respective programs stored in the main storage device 42 or the auxiliary storage device 43.

Also, these programs are stored in a non-temporary data storage medium that is readable by the information processing apparatus, such as a secondary storage device, a storage device such as a non-volatile semiconductor memory, a hard disk drive, or an SSD, an IC card, an SD card, or a DVD, for example.

<Personal Information Analysis Process>

Next, a personal information analysis method performed by the personal information analysis system 1 will be described.

Figure 7:
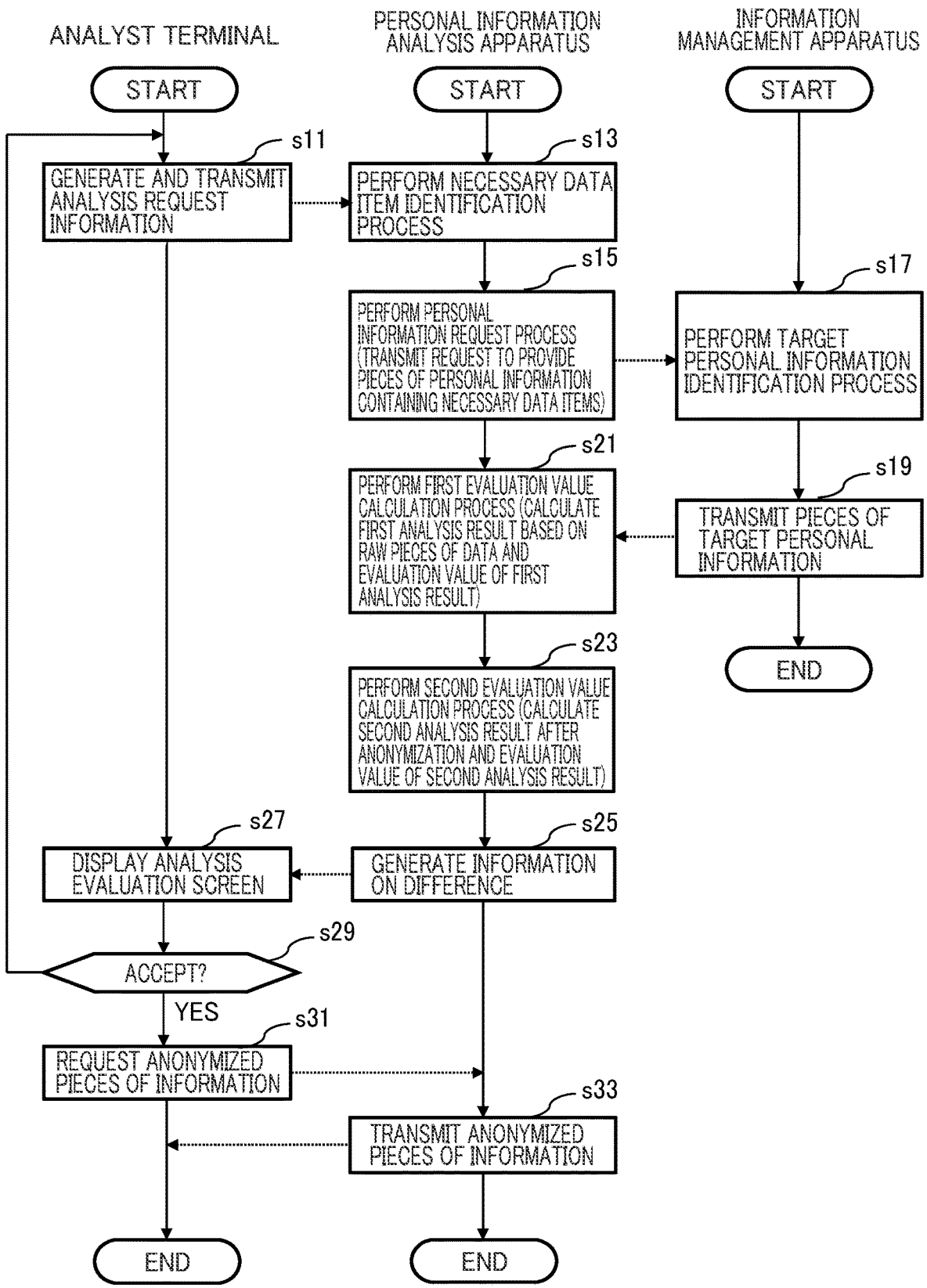
FIG. 7 is a flowchart explaining an example of a personal information analysis process.

FIG. 7 is a flowchart explaining an example of a process of analyzing pieces of personal information (personal information analysis process) performed by the personal information analysis system 1. This process is started, for example, when an analyst gives an input to start a predetermined analysis into the analyst terminal 20.

Firstly, the analyst terminal 20 generates information indicating the content of the analysis requested to be performed by the personal information analysis apparatus 10 (analysis request information), and transmits the generated analysis request information to the personal information analysis apparatus 10 (s11). Note that the analysis request information is generated, for example, with predetermined information inputted by the analyst into the analyst terminal 20.

FIG. 8 is a diagram illustrating an example of the analysis request information. Analysis request information 200 includes pieces of information of: an analysis target 201 indicating the analysis target; an anonymization method 202 indicating the method of the anonymization of the pieces of personal information 35 to be performed when the analysis target 201 is analyzed; an evaluation method 203 indicating the method by which to evaluate the result of the analysis of the analysis target 201; a proposed price 204 indicating an amount of money which the analyst can pay for the analysis of the analysis target 201; and a designated data item 205 being an item(s) designated by the analyst as an item(s) necessary for analyzing the analysis target (hereinafter referred to as the designated data item(s)).

Then, as described in s13 in FIG. 7, the personal information analysis apparatus 10 executes a process of identifying the necessary data item (hereinafter referred to as the necessary data item identification process) based on the analysis request information 200 received from the analyst terminal 20. Specifically, the personal information analysis apparatus 10 identifies, for example, all designated data items designated under the analysis target 201 as the necessary data items.

Then, the personal information analysis apparatus 10 executes a process of requesting the personal information management apparatus 30 to provide the pieces of personal information 35 containing information of the necessary data items (personal information request process) (s15). Specifically, the personal information analysis apparatus 10, for example, transmits information on the necessary data items identified in s13 to the personal information management apparatus 30.

Incidentally, in the case where there are a plurality of personal information management apparatuses 30 with which the personal information analysis apparatus 10 can communicate, the personal information analysis apparatus 10 may transmit the above request to each of the personal information management apparatuses 30.

In response to receiving the request from the personal information analysis apparatus 10, the personal information management apparatus 30 executes a process of identifying the pieces of personal information 35 containing information of the necessary data items (hereinafter referred to as the target personal information identification process) (s17).

<Target Personal Information Identification Process>

Figure 9:
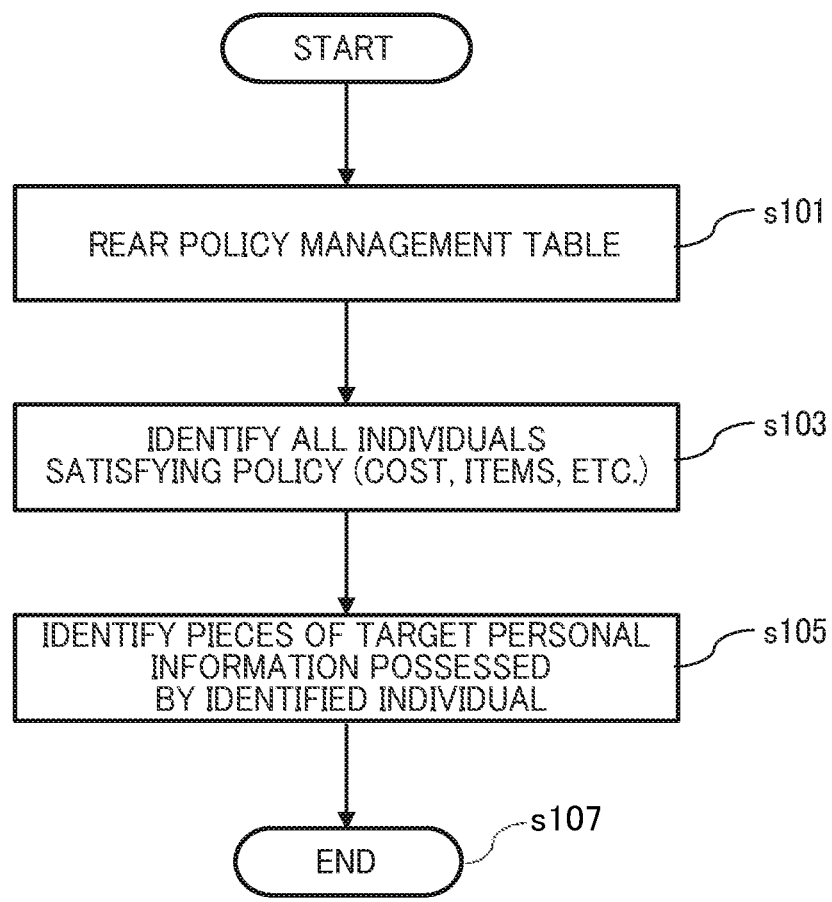
FIG. 9 is a flowchart explaining an example of a target personal information identification process.

Here, FIG. 9 is a flowchart explaining an example of the target personal information identification process in this embodiment. The personal information management apparatus 30 reads the policy management table 300 (s101), and identifies all individuals (clients) possessing information of the necessary data items and also having policies satisfying the condition designated in the analysis request information 200 (s103). Specifically, the personal information management apparatus 30 identifies, for example, all records in the policy management table 300 in which the price 302 is the proposed price 204 in the analysis request information 200 or less and the non-providable 303 contains none of the necessary data items.

The personal information management apparatus 30 then determines the pieces of personal information 35 possessed by all of the identified individuals as pieces of target personal information (s105). After the above, the target personal information identification process is terminated (s107).

Then, as described in s19 in FIG. 7, the personal information management apparatus 30 transmits the identified pieces of target personal information to the personal information analysis apparatus 10. Based on the pieces of target personal information received, the personal information analysis apparatus 10 generates an analysis result (first analysis result) for the request from the analyst terminal 20. The personal information analysis apparatus 10 also executes a process of calculating an evaluation value of the generated first analysis result (hereinafter referred to as the first evaluation value) by the evaluation method designated in the request from the analyst terminal 20 (first evaluation value calculation process) (s21). Specifically, the personal information analysis apparatus 10 calculates the first evaluation value, for example, by the evaluation method indicated as the evaluation method 203 in the analysis request information 200.

The personal information analysis apparatus 10 also anonymizes the received pieces of target personal information by the anonymization method designated in the request from the analyst terminal 20. Then, based on these anonymized pieces of information, the personal information analysis apparatus 10 generates an analysis result for the request from the analyst terminal 20 (second analysis result). The personal information management apparatus 30 also executes a process of calculating an evaluation value of the calculated second analysis result (hereinafter referred to as the second evaluation value) by the evaluation method designated in the request from the analyst terminal 20 (second evaluation value calculation process) (s23).

Specifically, the personal information analysis apparatus 10, for example, anonymizes an item among the necessary data items in the pieces of target personal information with which the corresponding individuals are identifiable (e.g., name) by the anonymization method indicated as the anonymization method 202 in the analysis request information 200 to thereby generate new pieces of information related to the pieces of target personal information (pieces of anonymized information), and generates the second analysis result based on these new anonymized pieces of information.

Note that, in the above, the personal information analysis apparatus 10 has already set the degree of the anonymization designated by the analyst terminal 20 is k-anonymization, k=4 or a similar value is set. Incidentally, in the case where the degree of the anonymization has already been designated in the analysis request information 200, this degree is set.

Note that the personal information analysis apparatus 10 may use (sample) only some of the pieces of target personal information to generate the first analysis result and the second analysis result when a predetermined condition is met (e.g., when the size of the pieces of target personal information or the number of individuals associated with them is above a predetermined threshold value or when the analysis request information 200 has set an instruction to do so).

Then, the personal information analysis apparatus 10 generates information on the difference between the evaluation value of the second analysis result (second evaluation value) and the evaluation value of the first analysis result (first evaluation value), and transmits the generated information on the difference to the analyst terminal 20 (s25). Specifically, the personal information analysis apparatus 10 calculates, for example, the difference between the evaluation values or the absolute value of the difference between the evaluation values. Note that in the case where the personal information analysis apparatus 10 calculates a plurality of second evaluation values in the second evaluation value calculation process, the personal information analysis apparatus 10 generates the information on the difference for all of the second evaluation values.

The analyst terminal 20, based on the information on the difference received from the personal information analysis apparatus 10, displays a screen indicating evaluation of the analysis (hereinafter referred to as the analysis evaluation screen) (s27).

<Analysis Evaluation Screen>

Figure 10:
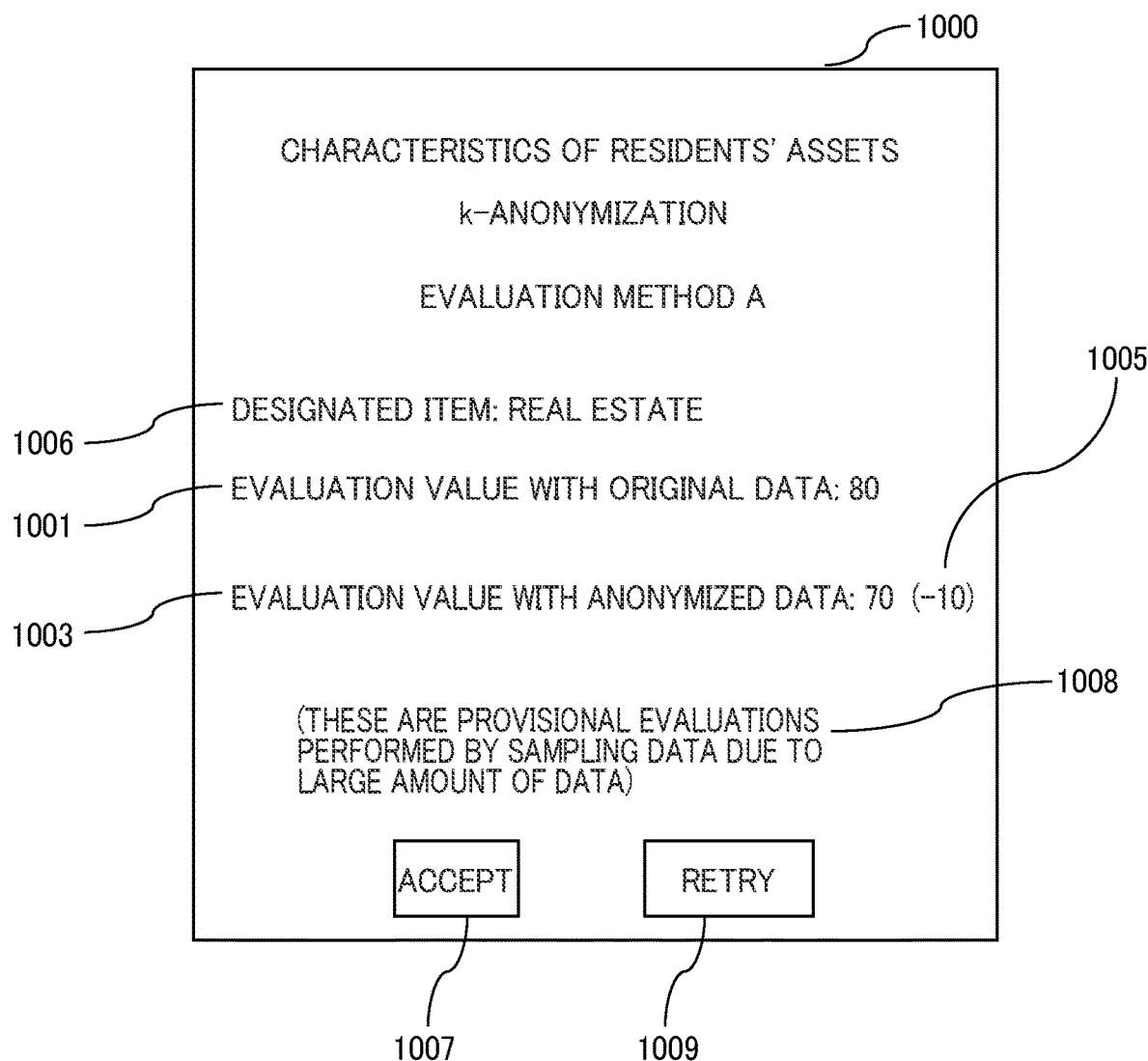
FIG. 10 is an example of an analysis evaluation screen displayed by the analyst terminal.

FIG. 10 is an example of the analysis evaluation screen displayed by the analyst terminal 20. The analysis evaluation screen are provided with a display area 1006 for the designated data items designated in the analysis request information 200, a display first evaluation value display area 1001 for displaying the first evaluation value of the analysis result based on the pieces of personal information 35 before the anonymization (first analysis result), a second evaluation value display area 1003 for displaying the second evaluation value of the analysis result based on the pieces of personal information 35 after the anonymization (second analysis result), and a difference display area 1005 for displaying the information on the difference between the first evaluation value and the second evaluation value. Note that in the case where sampling is performed in the personal information analysis process, a sampling display 1008 indicating that the sampling has been performed is presented.

With this analysis evaluation screen 1000, the analyst can check the difference in quality between the analysis result obtained by performing an analysis using the raw pieces of personal information 35 and the analysis result obtained by performing an analysis using the pieces of personal information 35 processed by the anonymization designated in the analysis request information 200.

The analysis evaluation screen 1000 also displays an acceptance area 1007 which the analyst selects to obtain the information of the second analysis result (e.g., the pieces of anonymized information), and a retry area 1009 which the analyst selects when wishing to perform an analysis again. If not satisfied with the content of the analysis performed this time, the analyst can select the retry area 1009 to perform an analysis again by a different analysis method.

Specifically, as described in s29 in FIG. 7, the analyst terminal 20 determines whether to accept the current analysis. Specifically, the analyst terminal 20 accepts selection of the acceptance area 1007 or the retry area 1009 in the analysis evaluation screen 1000, for example.

If the current analysis is not accepted (s29: NO), the analyst terminal 20 repeats the process of s11 so as to request an analysis under a different condition. If, on the other hand, the current analysis is accepted (s29: YES), the analyst terminal 20 transmits a request to transmit the pieces of anonymized information to the personal information analysis apparatus 10 (s31).

In response to receiving this request, the personal information analysis apparatus 10 transmits the generated anonymized pieces of information to the analyst terminal 20 (s33). The analyst terminal 20 receives the anonymized pieces of information, and the analyst can freely utilize these pieces of anonymized information.

As described above, the personal information analysis system 1 in this embodiment generates a first analysis result based on a plurality of pieces of personal information 35 associated with items (data items) necessary for performing an analysis, anonymizes the plurality of pieces of personal information 35 and generates a second analysis result for the analysis request based on the anonymized pieces of information, and generates information on the difference between the generated first analysis result and second analysis result. In this way, the personal information analysis system 1 can provide the analysis requester with information on the difference in quality between the analysis result based on the anonymized pieces of personal information (anonymized pieces of information) and the analysis result obtained without the anonymization. This enables the analysis requester to know the analysis accuracy of the analysis result based on the anonymized pieces of information. On the other hand, as for the data holders of the pieces of personal information, their information will not be disclosed by this analysis. Thus, with the personal information analysis apparatus 10 in this embodiment, it is possible to provide a third party with useful information utilizing personal information while protecting this personal information.

Second Embodiment

In the first embodiment, the personal information analysis apparatus 10 generates analysis results based on an analysis method designated from the analyst terminal 20. The personal information analysis apparatus 10 in this embodiment generates analysis results also by an analysis method not designated from the analyst terminal 20.

In the following, a description will be given of the part of the configuration of the personal information analysis apparatus 10 in this embodiment different from that in the first embodiment.

First of all, the analysis execution part 11 of the personal information analysis apparatus 10 in this embodiment generates a first analysis result and a second analysis result by the personal information analysis method designated in an analysis request, and generates another first analysis result and another second analysis result by a personal information analysis method not designated in the analysis request.

Then, the analysis result evaluation part 12 generates information on the difference between the first analysis result and the second analysis result generated by the designated analysis method (first difference information) and generates information on the difference between the other first analysis result and the other second analysis result generated by the undesignated analysis method (second difference information).

For example, in the analysis request, items (data items) to be used to perform an analysis are designated, and the analysis execution part 11 generates the other first analysis result and the other second analysis result for different items (other data items) from the designated items (designated data items).

The analysis evaluation screen display part 22 displays the first difference information and the second difference information.

Here, combinations of the above data items are stored in the following data item management table 400.
(Data Item Management Table 400)
FIG. 11 is a diagram illustrating an example of the data item management table 400. The data item management table 400 stores the correspondences between analysis subjects and data items, and includes at least one record having items of: an analysis subject name 401 storing an analysis subject; and a data item name 402 storing one or more data items related to personal information that are necessary for analyzing the analysis subject in the analysis subject name 401. Note that a plurality of items may be combined as the data items. Also, in this embodiment, a plurality of combinations of data items (data item names 402) may be present for the analysis subject name 401 of a single content.

Next, the personal information analysis process will be described. In the personal information analysis process in this embodiment, the necessary data item identification process differs from that in the first embodiment.

Figure 12:
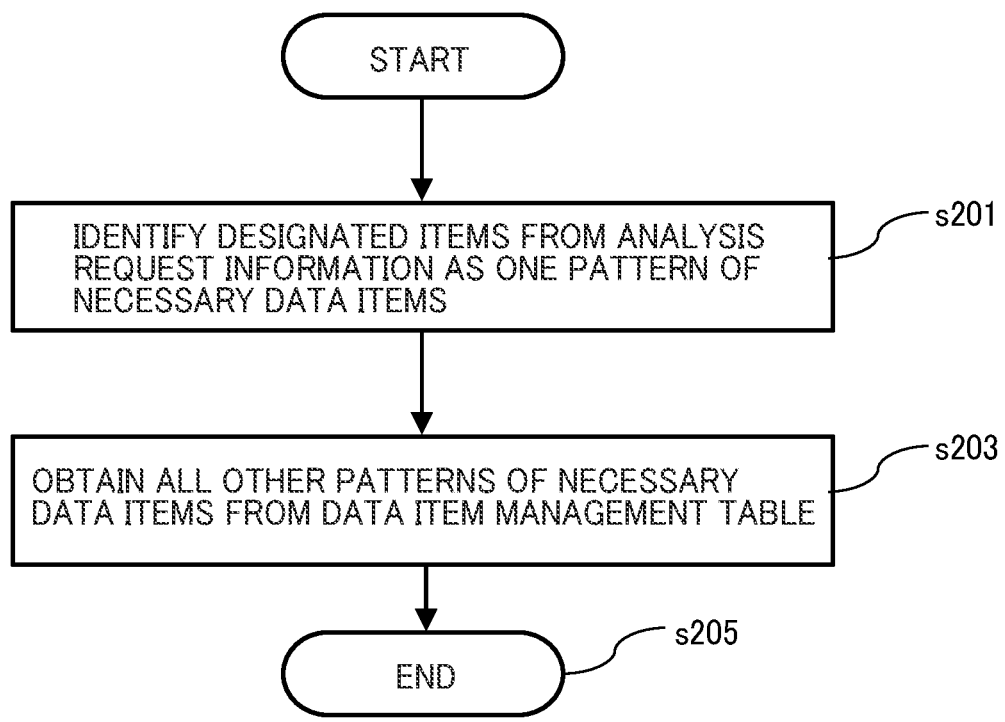
FIG. 12 is a flowchart explaining an example of a necessary data item identification process performed in a second embodiment.

FIG. 12 is a flowchart explaining an example of the necessary data item identification process performed in the second embodiment. Firstly, in response to receiving the analysis request information 200 from the analyst terminal 20, the personal information analysis apparatus 10 identifies the designated data items designated in the analysis target 201 in the received analysis request information 200 as one pattern of necessary data items (s201).

Further, the personal information analysis apparatus 10 identifies all data items other than the designated data items that are associated with the analysis subject as another pattern of necessary data items (s203). Specifically, the personal information analysis apparatus 10 obtains, for example, the contents of the data item names 402 in all records in the data item management table 400 storing the content of the analysis target 201 in the analysis request information 200 as the analysis subject in the analysis subject name 401.

After the above, the necessary data item identification process is terminated (s205). Then, the personal information analysis apparatus 10 requests the personal information management apparatus 30 to provide the pieces of personal information 35 corresponding to the identified necessary data items.

Incidentally, the subsequent part of the personal information analysis process is similar to that in the first embodiment. The personal information analysis apparatus 10 generates or calculates the first analysis results, the first evaluation values, the second analysis results, and the second evaluation values based on the pieces of target personal information corresponding to the necessary data items which are received from the personal information management apparatus 30. The personal information analysis apparatus 10 then generates the information on the difference between each second evaluation value and the corresponding first evaluation value, and transmits the information on the difference to the analyst terminal 20.

Figure 13:
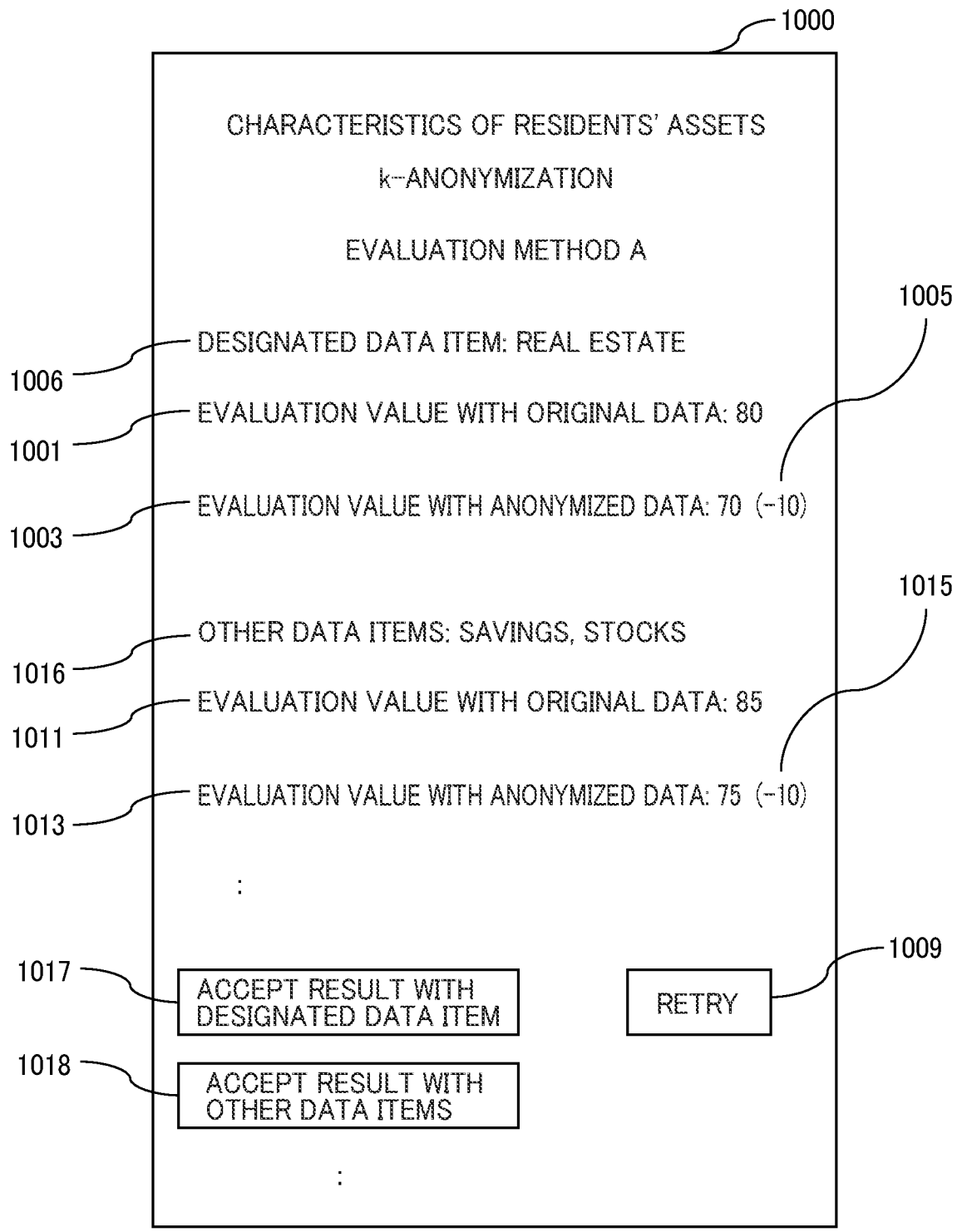
FIG. 13 is a diagram illustrating an example of an analysis evaluation screen in the second embodiment.

FIG. 13 is a diagram illustrating an example of the analysis evaluation screen 1000 in the second embodiment. As illustrated in the diagram, this analysis evaluation screen 1000 displays the display area 1006 for the designated data items, the first evaluation value display area 1001, the second evaluation value display area 1003, and the difference display area 1005 for the first difference information, as in the first embodiment, and also an other data item display area 1016 for displaying the other data items, an other first evaluation value display area 1011 for displaying the first evaluation value of the analysis based on the other data items, an other second evaluation value display area 1013 for displaying the second evaluation value of the analysis based on the other data items, and an other difference display area 1015 for the second difference information.

The analysis evaluation screen 1000 also displays an acceptance area 1017 which the analyst selects to obtain the information of the second analysis result (e.g., pieces of anonymized information) based on the designated data items and an acceptance area 1018 which the analyst selects to obtain the information of the second analysis result (e.g., pieces of anonymized information) based on the other data items, as well as the retry area 1009. Meanwhile, when there are a plurality of analysis results based on the other data items, a desired analysis result may select from among them.

With this analysis evaluation screen 1000, the analyst can check the difference between the quality of the analysis based on the data items designated by the analyst (designated data items) and the quality of the analysis based on the data items other than them (other data items) and obtain desirable pieces of anonymized information between them.

Meanwhile, in this embodiment, the analysis methods designated by the analyst involve designation of data items related to personal information. However, various other analysis methods can be designated which involve designation of the analysis cost, designation of the data holder(s), designation of the freshness of information (such as the date of the last update of the pieces of personal information 35), designation of the evaluation method, or the like.

Third Embodiment

In a third embodiment, the personal information analysis apparatus 10 performs anonymization at a plurality of degrees on the assumption that the anonymization method designated by the analyst terminal 20 is used, and presents these to the analyst. In the following, a description will be given of the part different from the first embodiment.

First of all, the personal information analysis apparatus 10 in this embodiment includes an analysis execution part 11 which has a function of generating a plurality of second analysis results by performing anonymization at a plurality of degrees by the anonymization method designated in the analysis request.

Next, the personal information analysis process will be described. In the personal information analysis process in this embodiment, the second evaluation value calculation process differs from that in the first embodiment.

Figure 14:
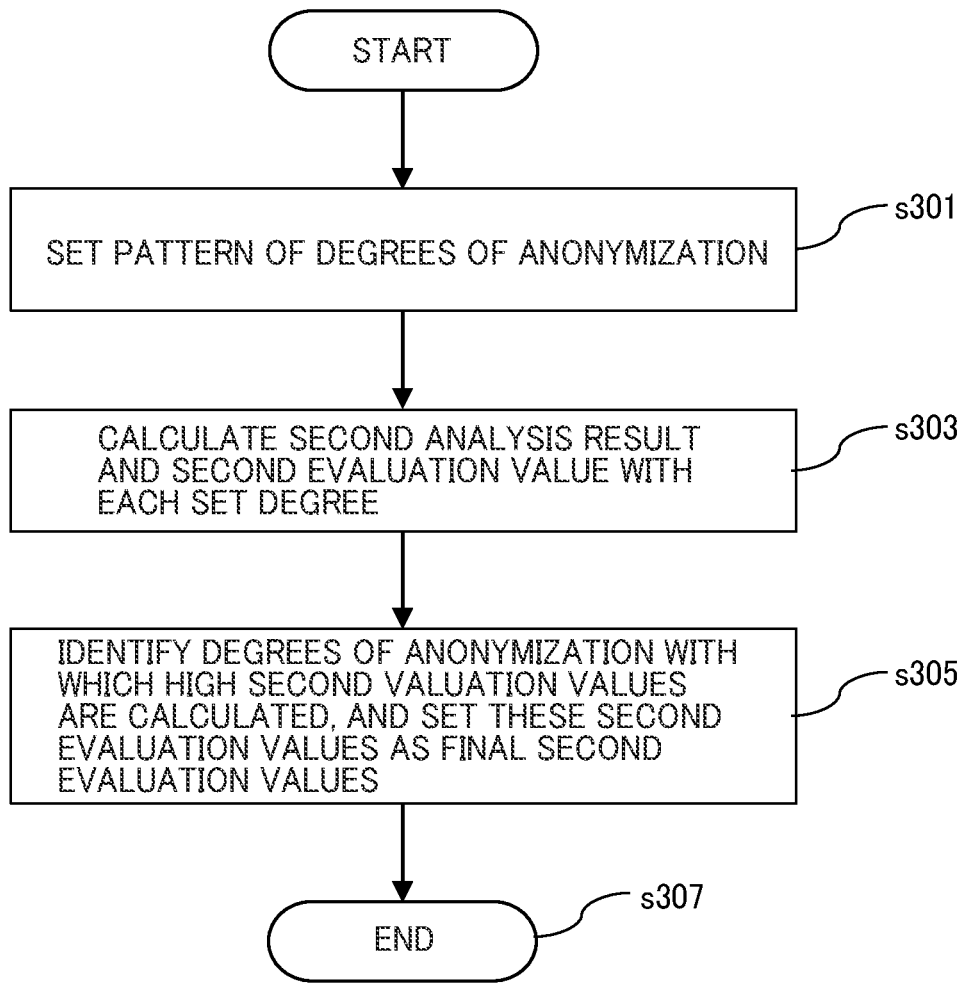
FIG. 14 is a flowchart explaining an example of a second evaluation value calculation process in a third embodiment.

FIG. 14 is a flowchart explaining an example of the second evaluation value calculation process in the third embodiment. Firstly, the personal information analysis apparatus 10 sets a plurality of degrees at which to perform the anonymization designated in the anonymization method 202 in the analysis request information 200 (s301). For example, in the case where k-anonymization is designated in the anonymization method 202 in the analysis request information 200, the personal information analysis apparatus 10 sets k=3, 4, 5.

Note that as the pattern of degrees of anonymization to be thus set, a preset pattern may be used, for example. Alternatively, if a degree is designated in the analysis request information 200, values near this degree may be used.

Then, the personal information analysis apparatus 10 calculates a second analysis result and its second evaluation value with each degree thus set (s303).

The personal information analysis apparatus 10 identifies the degrees of anonymization with which high second evaluation values were calculated among the plurality of calculated second evaluation values, and stores these high second evaluation values as the final second evaluation values (s305). Note that the "high second evaluation values" may be, for example, second evaluation values above a predetermined threshold value or a predetermined number of relatively high second evaluation values. After the above, the second evaluation value calculation process is terminated (s307).

Figure 15:
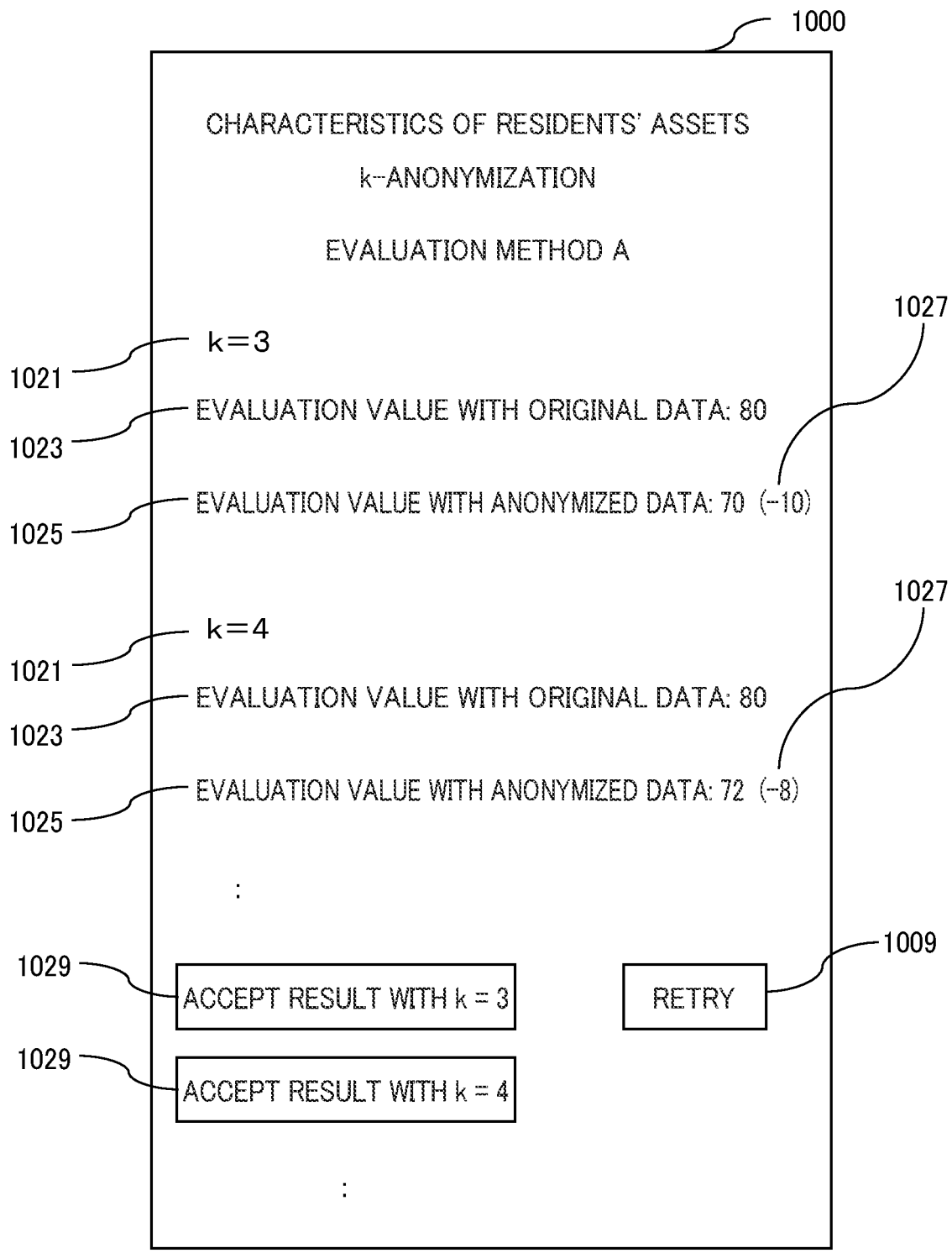
FIG. 15 is a diagram illustrating an example of an analysis evaluation screen in the third embodiment.

FIG. 15 is a diagram illustrating an example of the analysis evaluation screen 1000 in the third embodiment. As illustrated in the diagram, this analysis evaluation screen 1000 displays, for each degree of anonymization, a display area 1021 for the degree, a display area 1023 for the first evaluation value, a display area 1025 for the second evaluation value, and a difference display area 1027 for displaying the information on the difference.

The analysis evaluation screen 1000 also displays selection areas 1029 for the analyst to select which piece of information to obtain among the pieces of information (e.g., anonymized information) of the second analysis results obtained from the analyses based on the plurality of degrees of anonymization, as well as the retry area 1009.

By referring to this analysis evaluation screen 1000, the analyst can obtain desirable (e.g., the evaluation value is high but the degree of anonymization is not too high) pieces of anonymized information.

Fourth Embodiment

In a fourth embodiment, the personal information analysis apparatus 10 encrypts the data to be used in the calculation of the analysis results and the evaluation values in advance in order to prevent the data from leakage to the outside. In the following, a description will be given of the part different from the first embodiment.

First of all, the personal information analysis apparatus 10 in this embodiment includes an analysis execution part 11 which has a function of encrypting a plurality of pieces of personal information corresponding to an analysis request and generating a first analysis result based on the plurality of encrypted pieces of personal information, and anonymizing the encrypted pieces of personal information and generating a second analysis result for the analysis request based on the anonymized pieces of information.

Next, the personal information analysis process will be described.

Figure 16:
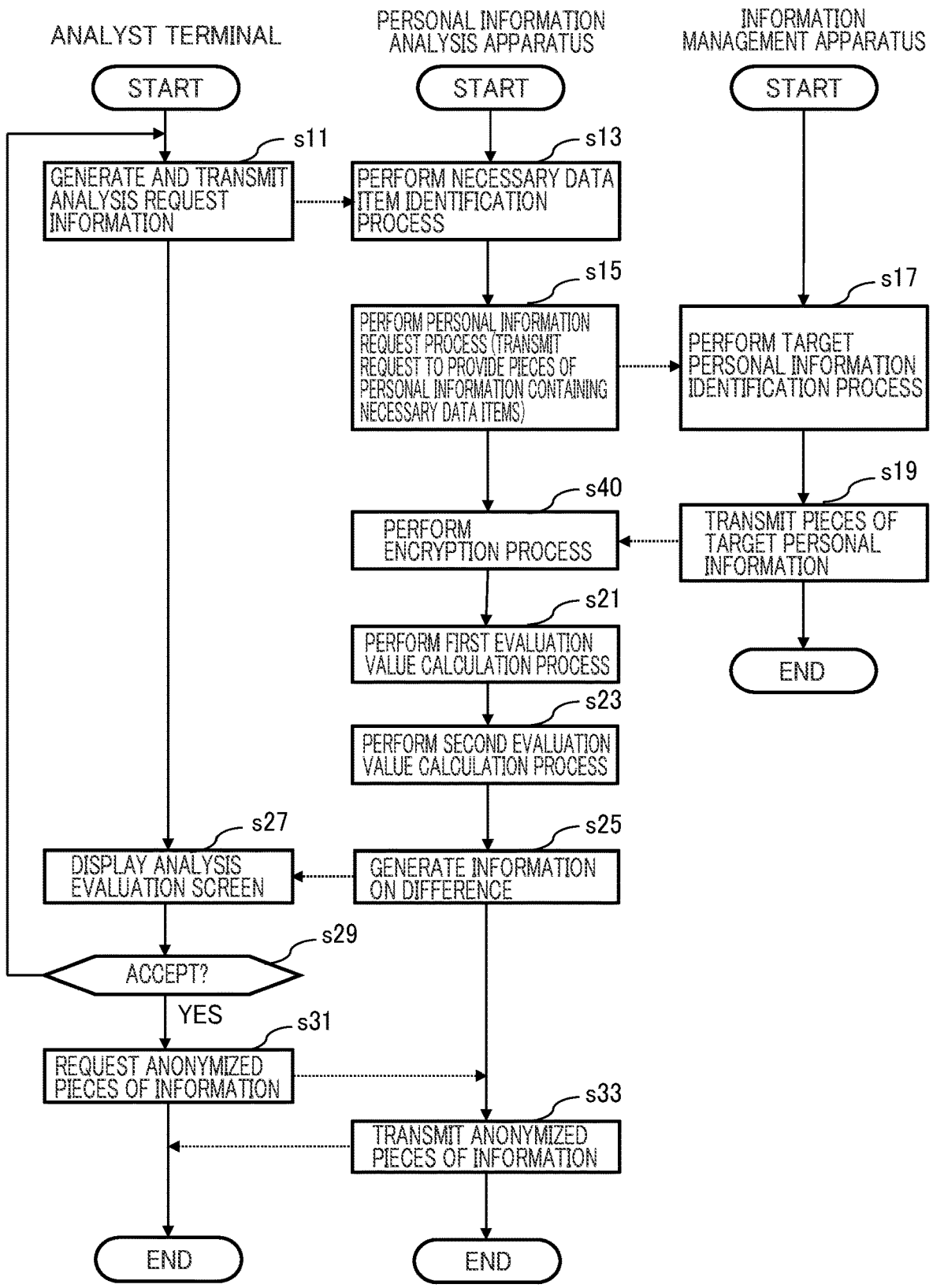
FIG. 16 is a diagram illustrating an example of a personal information analysis process in a fourth embodiment.

FIG. 16 is a flowchart illustrating an example of the personal information analysis process in the fourth embodiment. As in the first embodiment, after the processes of s11 to s17 are executed, the personal information management apparatus 30 transmits the pieces of target personal information to the personal information analysis apparatus 10 (s19). In response to receiving the pieces of target personal information from the personal information management apparatus 30, the personal information analysis apparatus 10 performs an encryption process on the pieces of target personal information (s40) and executes the first evaluation value calculation process (s21) and the second evaluation value calculation process (s23) on these encrypted pieces of information. Specifically, the personal information analysis apparatus 10 encrypts (conceals) the pieces of target personal information by using, for example, k-anonymization, secret sharing, homomorphic encryption, or the like.

The subsequent processes of s25 to s29 are similar to those in the first embodiment. As for the anonymized pieces of information in the analysis designated by the analyst via the analysis evaluation screen 1000 on the analyst terminal 20, the personal information analysis apparatus 10 transmits these anonymized pieces of information generated in the encrypted state to the analyst terminal 20 (s31, s33). Incidentally, when transmitting the anonymized pieces of information to the analyst terminal 20, the personal information analysis apparatus 10 may transmit the pieces of information in the encrypted state or decrypt the pieces of information and then transmit them.

Fifth Embodiment

Figure 17:
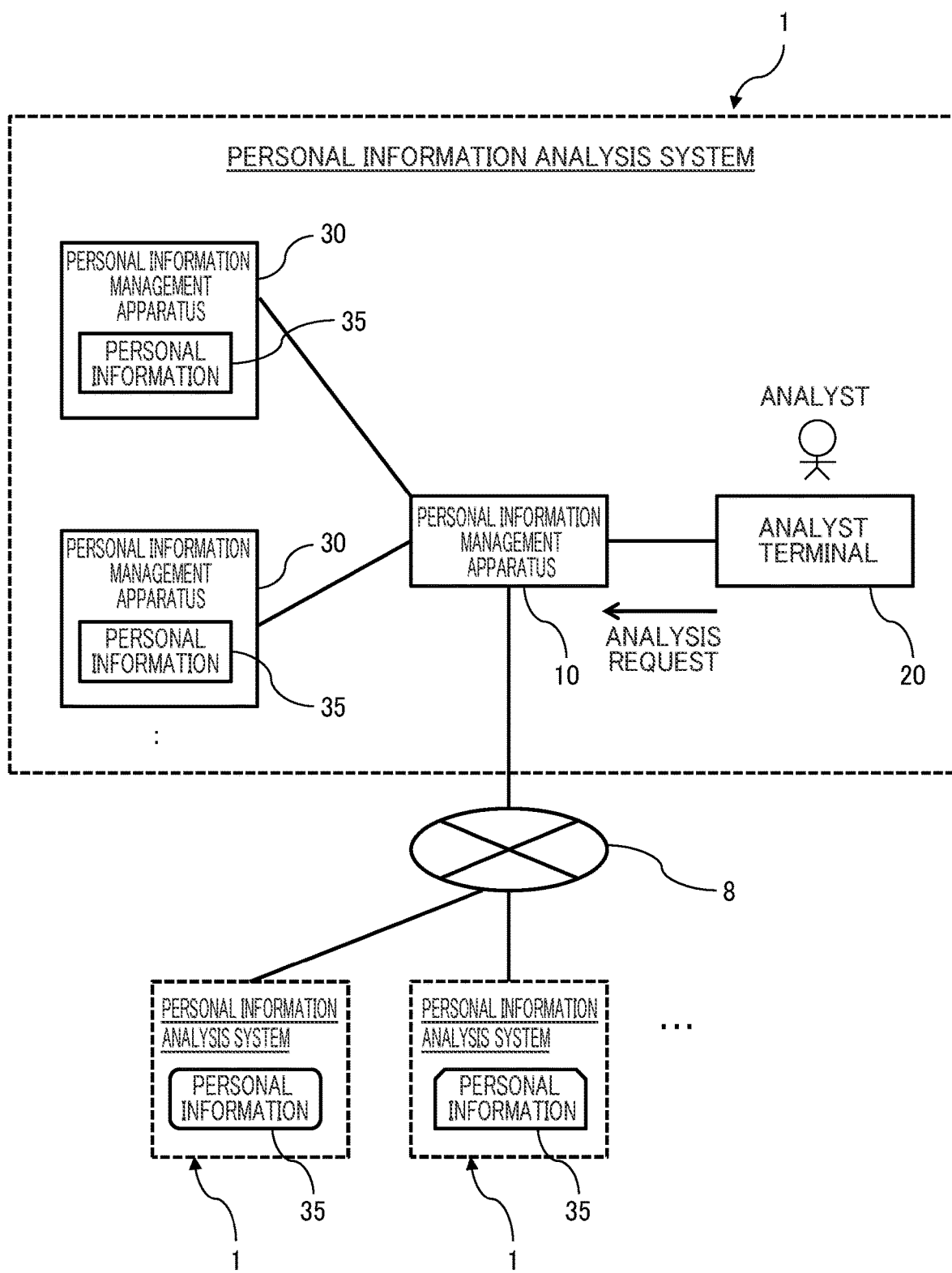
FIG. 17 is a diagram illustrating an example of the system configuration of personal information analysis systems 1 in a fifth embodiment.

FIG. 17 is a diagram illustrating an example of the system configuration of personal information analysis systems 1 in a fifth embodiment. In this embodiment, as illustrated in the diagram, a plurality of personal information analysis systems 1 are present, and these personal information analysis system 1 are coupled to each other in a communicable manner by a wired or wireless communication network 8, such as a LAN (Local Area Network), a WAN (Wide Area Network), the Internet, or a dedicated line.

Here, in this embodiment, the personal information analysis systems 1 (personal information management apparatuses 30) manage pieces of personal information 35 having items that are pieces of data of the same kind or conceptually similar pieces of data but are different as data items. Each personal information analysis system 1 in this embodiment obtains pieces of personal information 35 from another suitable personal information analysis system(s) 1 among the plurality of personal information analysis systems 1 and analyzes them. In the following, a description will be given of the part different from the first embodiment.

First of all, each personal information analysis apparatus 10 in this embodiment includes an analysis execution part 11 which has a function of identifying each personal information analysis system 1 storing pieces of personal information 35 associated with items (data items) necessary for performing an analysis among the other personal information analysis systems 1 storing pieces of personal information 35, obtaining the pieces of personal information 35 from the identified personal information analysis system 1, and generating a first analysis result and a second analysis result based on the obtained pieces of personal information 35.

To implement this function, each personal information analysis apparatus 10 stores a similar item management table defining data items that are conceptually similar to each other.

Figure 18:
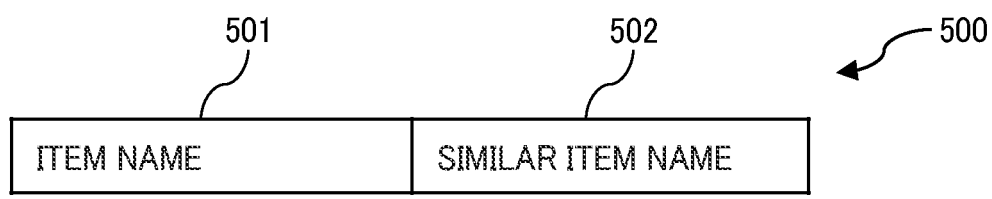
FIG. 18 is a diagram illustrating an example of a similar item management table.

FIG. 18 is a diagram illustrating an example of the record configuration of the similar item management table. A similar item management table 500 includes one or more records each having items of: an item name 501 storing a name of a data item; and a similar item name 502 storing a list of data items that are conceptually similar to or of the same kind as the data item in the item name 501.

Next, the personal information analysis process will be described. In the personal information analysis process in this embodiment, the personal information request process differs from that in the first embodiment.

Figure 19:
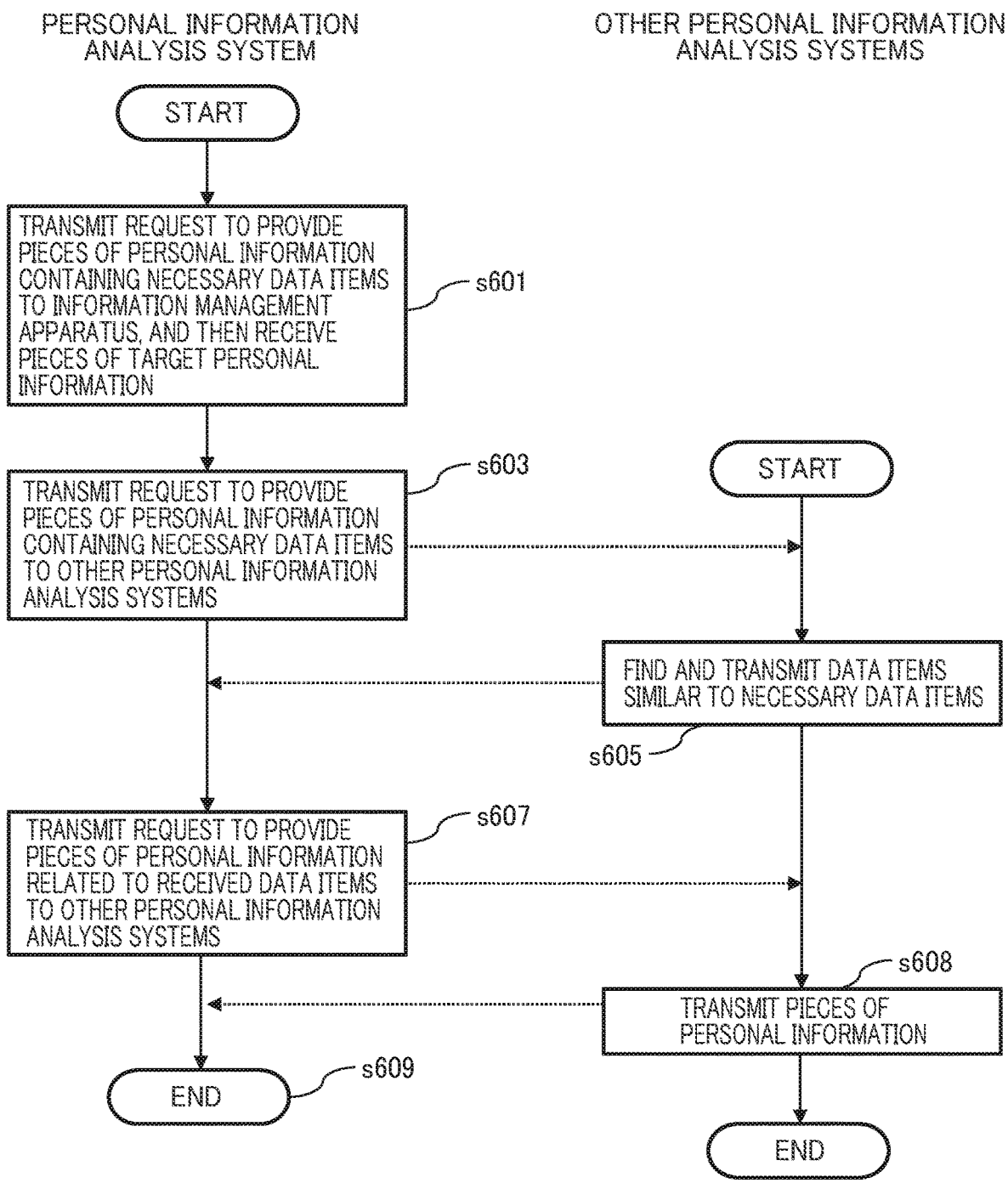
FIG. 19 is a flowchart illustrating an example of a personal information request process in the fifth embodiment.

FIG. 19 is a flowchart illustrating an example of the personal information request process in the fifth embodiment. Firstly, as in the first embodiment, the personal information analysis apparatus 10 transmits a request to provide pieces of personal information 35 containing information of the necessary data items to each personal information management apparatus 30 in its personal information analysis system 1, and then receives pieces of target personal information from the personal information management apparatus 30 (s601).

Then, the personal information analysis apparatus 10 transmits a request to provide pieces of personal information 35 containing information of the necessary data items to the other personal information analysis systems 1 (s603). Specifically, the personal information analysis apparatus 10 transmits the request to the personal information management apparatuses 30 of the other personal information analysis systems 1.

The personal information analysis systems 1 having received the request search for data items conceptually similar to the necessary data items indicated in the received request (similar items, including data items of the same kind), and transmit the data items found to the personal information analysis apparatus 10 that transmitted the request (s605). Specifically, the personal information analysis apparatuses 10 refer to the similar item management table 500, obtain the contents of the similar item names 502 in the records storing the designated data items in their item names 501, and transmit them to the personal information analysis apparatus 10.

The personal information analysis apparatus 10 having received the data items transmits a request to provide the pieces of personal information 35 related to the received data items to the other personal information analysis systems 1 (personal information analysis apparatuses 10) that transmitted the data items (s607).

Incidentally, in doing so, the personal information analysis apparatus 10 may firstly obtain the data size of each of the pieces of personal information 35 related to the data items from the other personal information analysis systems 1 (personal information analysis apparatuses 10) and, only if the data size satisfies a predetermined condition (e.g., the data size is greater than or equal to a predetermined threshold value or is less than or equal to a predetermined threshold value), transmit a request to provide only that piece of personal information. In this way, the first analysis result and the second analysis result can be generated based on the personal information analysis systems 1 storing pieces of personal information 35 with desirable data accuracy.

The other personal information analysis systems 1 (personal information analysis apparatuses 10) having received the request to provide the pieces of personal information 35 transmit the pieces of personal information 35 in the personal information analysis systems 1 corresponding to the request to the personal information analysis apparatus 10 that transmitted the request (s608). This personal information analysis apparatus 10 then stores the received pieces of personal information 35 as the pieces of target personal information. After the above, the personal information request process is terminated (s609).

The subsequent part of the processing is similar to that in the first embodiment.

The description of the above embodiments is intended to facilitate understanding of the present invention and not intended to limit the present invention. Changes and modifications can be made to the present invention without departing from the gist thereof, and the present invention includes equivalents thereof.

For example, in the embodiments, a case where the personal information management apparatus 30 encrypts pieces of personal information 35 and transmits them to the personal information analysis apparatus 10 has been shown. However, this encryption may be omitted.

Also, in the embodiments, the personal information management apparatus 30 stores policies, but the personal information analysis apparatus 10 may store the policies.

From what has been described in this description, at least the following are made clear. Specifically, the personal information analysis systems 1 in the embodiments may be such that the analysis execution part generates the first analysis result and the second analysis result by an analysis method designated in the request for the analysis, and generates another first analysis result and another second analysis result by an analysis method not designated in the request for the analysis, and the analysis result evaluation part generates first difference information being the information on the difference between the first analysis result and the second analysis result generated by the designated analysis method and generates second difference information being information on a difference between the other first analysis result and the other second analysis result generated by the undesignated analysis method.

By performing analyses by the personal information analysis method designated in the request for the analysis and analyses by the analysis method not designated in the request and generating the information on the difference for each of them as described above, the requester of the analysis can obtain information on an analysis result by an analysis method which the requester did not expect. This enables the requester to obtain a high-quality analysis result and anonymized information which the requester did not expect.

Also, the personal information analysis systems 1 in the embodiments may be such that in the request for the analysis, the item to be used to perform the analysis is designated, and the analysis execution part generates the other first analysis result and the other second analysis result for an item different from the designated item.

By performing analyses with the data item designated in the request for the analysis and analyses with a data item not designated in the request and generating the information on the difference for each of them as described above, the requester of the analysis can obtain information on an analysis result based on an item which the requester did not expect. This enables the requester to obtain an analysis result and anonymized information from a more complicated viewpoint.

Also, the personal information analysis systems 1 in the embodiments may be such that the analysis execution part generates a plurality of the second analysis results by performing anonymization at a plurality of degrees by an anonymization method designated in the request for the analysis.

Performing anonymization at a plurality of degrees as described above, for example, enables the analysis requester to obtain an analysis result based on pieces of personal information 35 with high specificity while ensuring anonymity of the pieces of personal information 35.

Also, the personal information analysis systems 1 in the embodiments may be such that the analysis execution part encrypts the plurality of pieces of personal information corresponding to the request for the analysis and generates the first analysis result based on the plurality of encrypted pieces of personal information, and anonymizes the encrypted pieces of personal information and generates the second analysis result for the request for the analysis based on the anonymized pieces of information.

By encrypting the pieces of personal information 35 before analyzing them as described above, even if the pieces of personal information 35 leak in the course of the analysis process, it is possible to prevent a third party from utilizing them. Accordingly, the pieces of personal information 35 can be protected effectively.

Also, the personal information analysis systems 1 in the embodiments may be such that the analysis execution part identifies, among other personal information analysis systems storing the pieces of personal information, a personal information analysis system storing the pieces of personal information associated with the item necessary for performing the analysis, obtains the pieces of personal information from the identified personal information analysis system, and generates the first analysis result and the second analysis result based on the obtained pieces of personal information.

As described above, among the other personal information analysis systems 1, each personal information analysis system 1 storing the pieces of personal information 35 associated with the item necessary for performing the analysis is identified, and the analysis results are generated based on these pieces of personal information 35. In this way, even when, for example, the host personal information analysis system 1 and the other personal information analysis systems have different data items, the analysis results can be generated based on corresponding data items. This makes it possible to enhance cooperation between the personal information analysis systems 1 and utilize a larger number of pieces of personal information 35.

Also, the personal information analysis systems 1 in the embodiments may be such that, based on a policy being a condition for use of the pieces of personal information in the analysis, the analysis execution part identifies the pieces of personal information to be used in the analysis, and generates the first analysis result and the second analysis result based on the identified pieces of personal information.

By generating the analysis results based on a policy for use of the pieces of personal information 35 in the analysis as described above, the pieces of personal information 35 to be used in the analysis can be controlled. Accordingly, the pieces of personal information 35 can be protected more effectively.

Also, the personal information analysis systems 1 in the embodiments may be such that the analysis execution part generates the first analysis result based on pieces of personal information selected from among the plurality of pieces of personal information, and anonymizes the pieces of personal information and generates the second analysis result based on the anonymized pieces of information.

By generating the analysis results with and performing anonymization of pieces of personal information selected from among the plurality of pieces of personal information 35 as described above, it is possible to provide the analysis requester with the analysis results and the information on the difference between them in a reasonable time even when, for example, there are a vast amount of personal information 35 and it will take time to process them.

Also, the personal information analysis systems 1 in the embodiments may further comprise an analysis evaluation screen display part that displays the information on the difference between the generated first analysis result and the generated second analysis result.

This enables the analysis requester to know information on the difference in quality between the analysis result based on the anonymized pieces of personal information 35 (anonymized pieces of information) and the analysis result obtained without the anonymization.

Also, the personal information analysis systems 1 in the embodiments may further comprise an analysis evaluation screen display part that displays the first difference information and the second difference information.

This enables the analysis requester to know information on the difference in quality between the result by the analysis method designated in the request and the result by the analysis method not designated in the request.

REFERENCE SIGNS LIST 1 personal information analysis system
10 personal information analysis apparatus 20 analyst terminal
30 personal information management apparatus
35 personal information
11 analysis execution part
12 analysis result evaluation part

The invention claimed is:

1. A personal information analysis system comprising:
a personal information management apparatus that receives and stores a plurality of pieces of personal information,
the personal information management apparatus comprising:
at least one memory storing at least one program; and
at least one processor which, when executing the at least one program, configures the processor to execute:
an analysis execution part that, in response to a request for an analysis on a predetermined subject utilizing pieces of personal information, generates a first analysis result based on the plurality of pieces of personal information associated with an item necessary for performing the analysis, and anonymizes the plurality of pieces of personal information and generates a second analysis result for the request for the analysis based on the anonymized pieces of information, wherein the request is generated from an analysis terminal; and
an analysis result evaluation part that generates information on a difference between the generated first analysis result and the generated second analysis result, wherein
the analysis execution part and the analysis result evaluation part are coupled to the analyst terminal and the personal information management apparatus, respectively, via a wired or wireless communication network,
the analysis terminal includes an analysis request transmission part and an analysis evaluation screen display part that displays the information on the difference between the generated first analysis result and the generated second analysis result, and
the analyst terminal determines whether to accept or to discard the generated analysis results.

2. The personal information analysis system according to claim 1, wherein
the analysis execution part generates the first analysis result and the second analysis result by a personal information analysis method designated in the request for the analysis, and generates another first analysis result and another second analysis result by a personal information analysis method not designated in the request for the analysis, and
the analysis result evaluation part generates first difference information being the information on the difference between the first analysis result and the second analysis result generated by the designated analysis method and generates second difference information being information on a difference between the other first analysis result and the other second analysis result generated by the undesignated analysis method.

3. The personal information analysis system according to claim 2, wherein
in the request for the analysis, an item in personal information to be used to perform the analysis is designated, and
the analysis execution part generates the other first analysis result and the other second analysis result for an item different from the designated item.

4. The personal information analysis system according to claim 1, wherein the analysis execution part generates a plurality of the second analysis results by performing anonymization at a plurality of degrees by an anonymization method designated in the request for the analysis.

5. The personal information analysis system according to claim 1, wherein the analysis execution part encrypts the plurality of pieces of personal information related to the request for the analysis and generates the first analysis result based on the plurality of encrypted pieces of personal information, and anonymizes the encrypted pieces of personal information and generates the second analysis result for the request for the analysis based on the anonymized pieces of information.

6. The personal information analysis system according to claim 1, wherein the analysis execution part identifies, among other personal information analysis systems storing the pieces of personal information, a personal information analysis system storing the pieces of personal information associated with the item necessary for performing the analysis, obtains the pieces of personal information from the identified personal information analysis system, and generates the first analysis result and the second analysis result based on the obtained pieces of personal information.

7. The personal information analysis system according to claim 1, wherein based on a policy being a condition for use of the pieces of personal information in the analysis, the analysis execution part identifies the pieces of personal information to be used in the analysis, and generates the first analysis result and the second analysis result based on the identified pieces of personal information.

8. The personal information analysis system according to claim 1, wherein the analysis execution part generates the first analysis result based on a piece of personal information selected from among the plurality of pieces of personal information, and anonymizes the piece of personal information and generates the second analysis result based on the anonymized piece of information.

9. The personal information analysis system according to claim 1, further comprising an analysis evaluation screen display part that displays the first difference information and the second difference information.

10. The personal information analysis system according to claim 1,
wherein in a case, wherein the generated analysis results are discarded, the analysis terminal is adapted to request a different analysis under a different condition.

11. A personal information analysis method implemented by a personal information analysis system having at least one processor and at least one memory storing at least one program, the method executed by the processor when executing the at least one program and comprising:
a process of receiving and storing a plurality of pieces of personal information, via a personal information management apparatus,
an analysis execution process of, in response to a request for an analysis on a predetermined subject utilizing pieces of personal information, generating a first analysis result based on the plurality of pieces of personal information associated with an item necessary for performing the analysis, and anonymizing the plurality of pieces of personal information and generating a second analysis result for the request for the analysis based on the anonymized pieces of information, wherein the request is generated from an analysis terminal; and
an analysis result evaluation process of generating information on a difference between the generated first analysis result and the generated second analysis result, wherein the analysis execution part and the analysis result evaluation part are coupled to the analyst terminal and the personal information management apparatus, respectively, via a wired or wireless communication network, the analysis terminal includes an analysis request transmission part and an analysis evaluation screen display part that displays the information on the difference between the generated first analysis result and the generated second analysis result, and the analysis terminal determines whether to accept or to discard the generated analysis results.

\* \* \* \* \*